(12) United States Patent
Drzewiecki et al.

(10) Patent No.: US 10,166,712 B2
(45) Date of Patent: Jan. 1, 2019

(54) METHOD AND APPARATUS FOR FABRICATING CONTAINERS

(71) Applicant: DISCMA AG, Zürich (CH)

(72) Inventors: Frederic Drzewiecki, Vittel (FR); Klaus Hartwig, Nancy (FR); Damien Kannengiesser, Golbey (FR)

(73) Assignee: DISCMA AG, Zürich (CH)

( * ) Notice: Subject to any disclaimer, the term of this patent is extended or adjusted under 35 U.S.C. 154(b) by 343 days.

(21) Appl. No.: 15/104,805

(22) PCT Filed: Dec. 16, 2014

(86) PCT No.: PCT/EP2014/078081
§ 371 (c)(1),
(2) Date: Jun. 15, 2016

(87) PCT Pub. No.: WO2015/091565
PCT Pub. Date: Jun. 25, 2015

(65) Prior Publication Data
US 2016/0318228 A1    Nov. 3, 2016

(30) Foreign Application Priority Data
Dec. 16, 2013  (EP) .................... 13197336

(51) Int. Cl.
*B29C 49/00* (2006.01)
*B29C 49/06* (2006.01)
*B29C 49/12* (2006.01)
*B65B 3/02* (2006.01)
*B65B 7/16* (2006.01)
(Continued)

(52) U.S. Cl.
CPC .......... *B29C 49/0042* (2013.01); *B29C 49/06* (2013.01); *B29C 49/12* (2013.01); *B29C 49/24* (2013.01); *B29C 49/46* (2013.01); *B65B 3/022* (2013.01); *B65B 7/16* (2013.01); *B65D 21/0205* (2013.01); *B65D 25/205* (2013.01);
(Continued)

(58) Field of Classification Search
CPC ..... B29C 49/0042; B29C 49/06; B29C 49/12; B29C 49/24; B29C 49/46; B29C 2049/4664; B29C 2049/0094; B29C 49/22; B65B 3/022; B65B 7/16; B65B 3/025; B65D 21/0205; B65D 25/205; B65D 71/06; B29L 2031/7178; B29K 2101/12
See application file for complete search history.

(56) References Cited

U.S. PATENT DOCUMENTS 2,013,382 A    9/1935  Garwood
5,135,702 A *  8/1992  Eales .................... B29C 49/20
                                                    264/515
(Continued)

FOREIGN PATENT DOCUMENTS

WO    2010003853 A1    1/2010
WO    2013114796 A1    8/2013

*Primary Examiner* — David Walczak
(74) *Attorney, Agent, or Firm* — Eric J. Sosenko; Jonathan P. O'Brien; Honigman Miller Schwartz and Cohn LLP

(57) ABSTRACT

A plurality of preforms are positioned in relation to each other and an incompressible fluid is injected into a cavity of each of the preforms to induce them to expand into containers. A portion of the surface of each of the preforms comes into abutment with a portion of the surface of at least one other preform during the injecting step, such that the expansion of the preforms is constrained.

28 Claims, 8 Drawing Sheets

(51) Int. Cl.
*B29C 49/24* (2006.01)
*B29C 49/46* (2006.01)
*B65D 21/02* (2006.01)
*B65D 25/20* (2006.01)
*B65D 71/06* (2006.01)
*B29L 31/00* (2006.01)
*B29K 101/12* (2006.01)

(52) U.S. Cl.
CPC ...... *B65D 71/06* (2013.01); *B29C 2049/4664* (2013.01); *B29K 2101/12* (2013.01); *B29L 2031/7158* (2013.01)

(56) References Cited

U.S. PATENT DOCUMENTS

| | | |
|---|---|---|
| 6,355,204 B1 | 3/2002 | Hickman et al. |
| 9,993,958 B2 * | 6/2018 | Chauvin ............. B29C 49/0042 |
| 2012/0315348 A1 | 12/2012 | Wilson et al. |

* cited by examiner

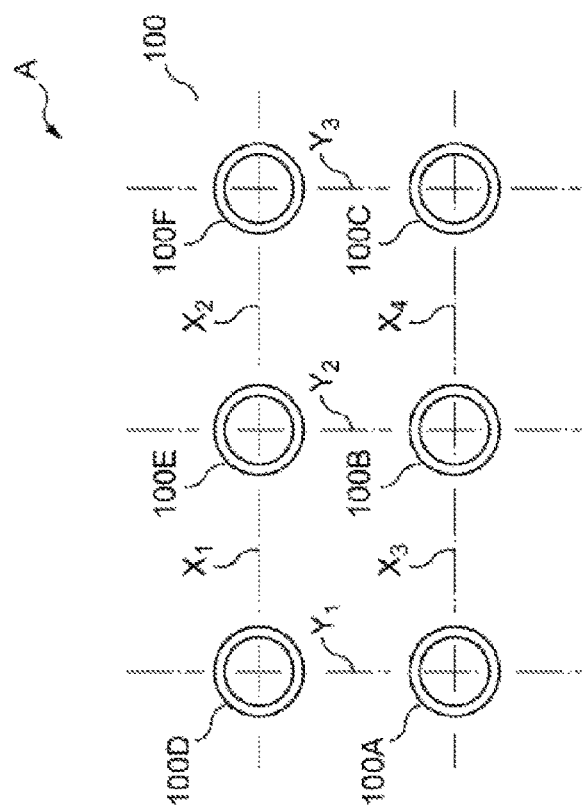
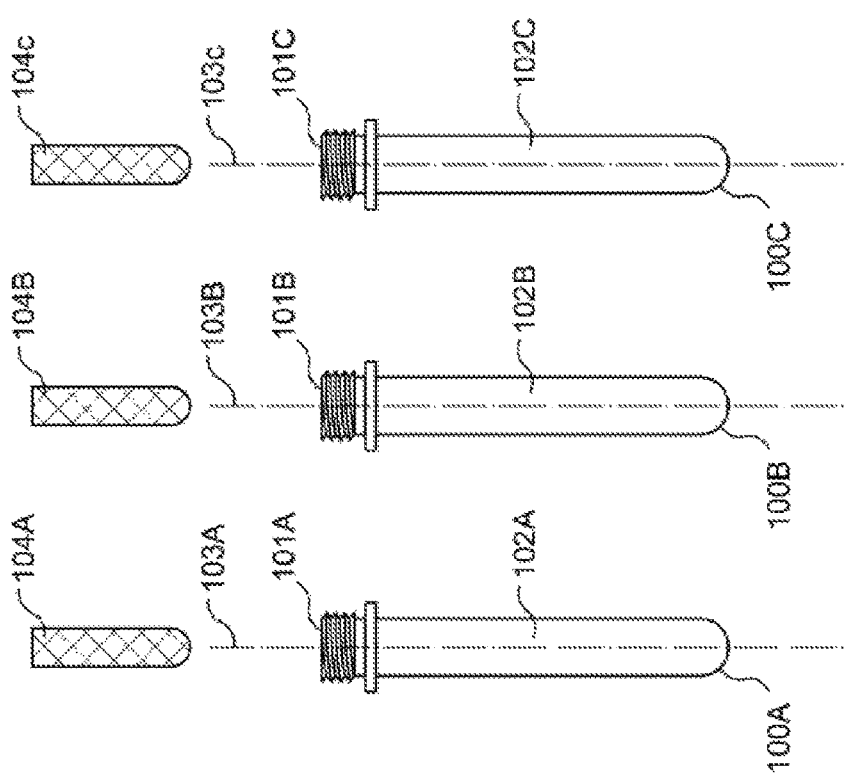
FIG.1B
FIG.1A

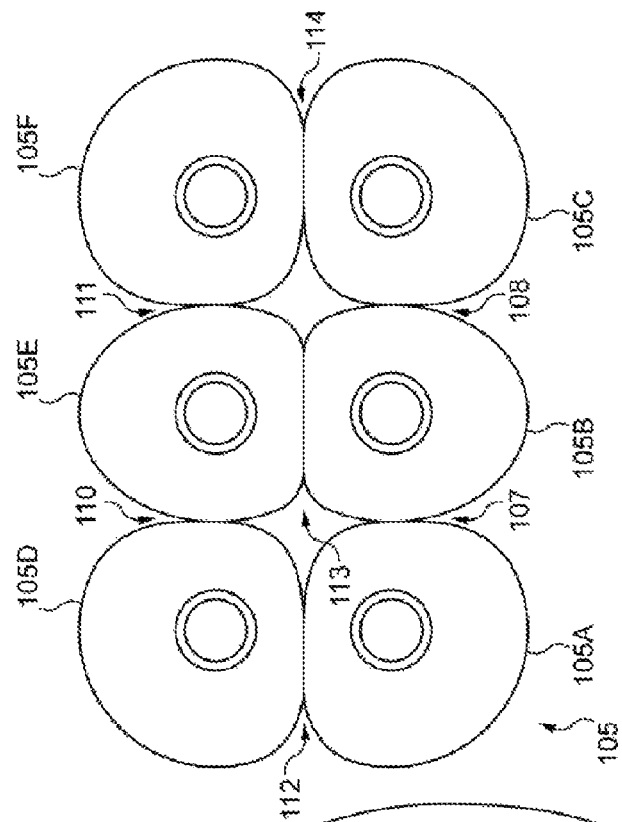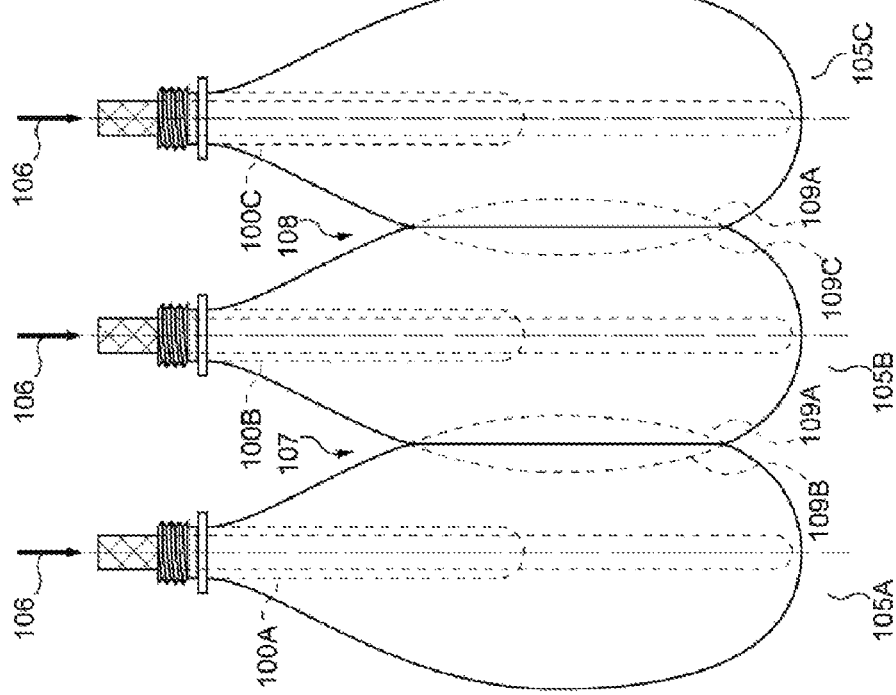

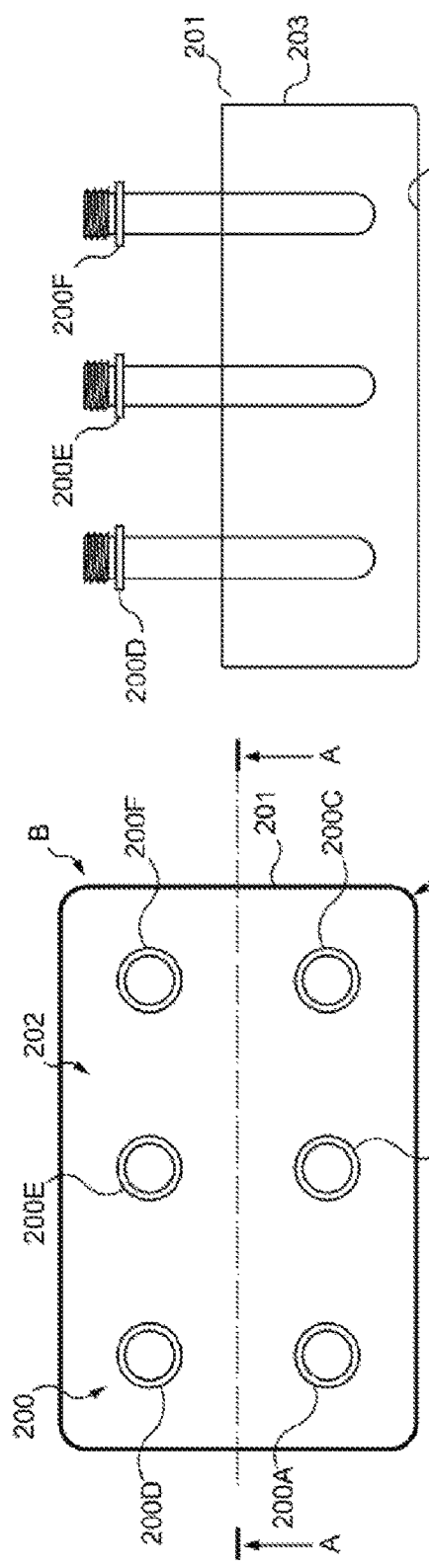
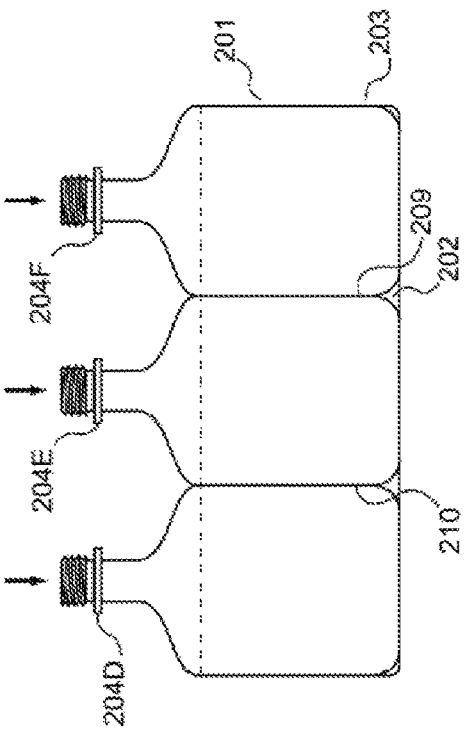
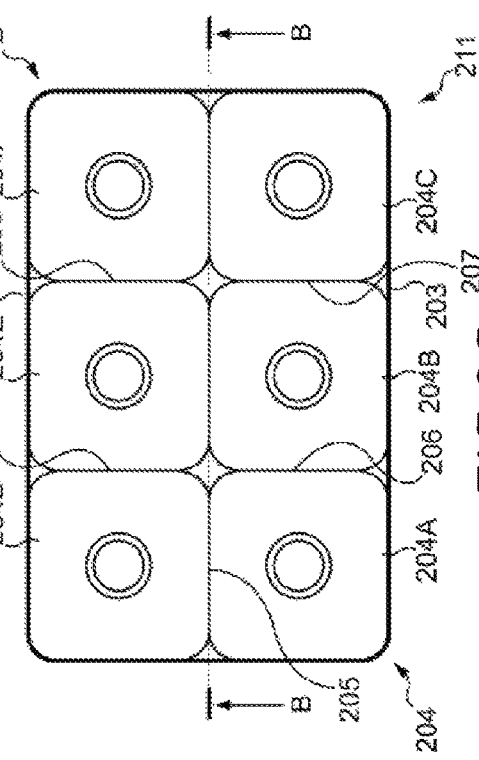
FIG.2A  FIG.2B  FIG.2C  FIG.2D

METHOD AND APPARATUS FOR FABRICATING CONTAINERS

CROSS-REFERENCE TO RELATED APPLICATIONS

This application is the U.S. National phase of PCT application no. PCT/EP2014/078081 filed on Dec. 16, 2014, which claims priority to EP13197336.4 filed on Dec. 16, 2013, the disclosures of which are incorporated in their entirety by reference herein.

TECHNICAL FIELD

The invention relates to a method for fabricating containers, in particular containers for liquid contents. The method also relates to an apparatus for carrying out such a method, and the containers produced by it.

BACKGROUND OF THE INVENTION

It has long been known to fabricate containers by blow-moulding, wherein a preform is inflated into the form of a container by the injection of a pressurized gas therein. The preform generally comprises a hollow, tubular body fabricated from a thermoplastic resin, having a cavity, a plain closed end, and a finished open end generally provided with threads or other means for engaging a closure device.

During the moulding process, the preform is disposed within the cavity of a mould which defines the form of a container, and then a pressurized gas is injected into the preform to induce it to expand into the form of a container. Preferably, a stretching rod is also advanced into this preform during the injection of the pressurized gas so as to induce it to stretch longitudinally during the blow-moulding process, yielding a greater degree of control over the longitudinal deformation of the preform during injection.

Recently, it has become known to perform the blow-moulding process with an incompressible working fluid rather than with a gas. The use of an incompressible fluid as the working fluid yields a greater degree of control over the expansion of the container. Furthermore, the incompressible fluid may be retained in the container after fabrication is completed; where the incompressible fluid is a liquid product, this enables the fabrication and filling of containers in a single step.

However, in the case of pressurized gas blow molding technology such systems are disadvantageous in that, as with the traditional pressurized-gas blow moulding systems, one may not fabricate multiple containers at once without furnishing a mould for each container to be fabricated with each cycle of the apparatus. These moulds are generally furnished as two or three segments, each segment defining a portion of the container surface and machined from a single block of aluminium or high-strength steel. Such moulds are complex and thus often expensive and time-consuming to fabricate, particularly in the quantities that are required for the operation of a high-volume container fabricating installation such as a beverage bottling line.

The prior art is insufficient to resolve this issue. For instance, the U.S. Pat. No. 2,013,382 ("GARWOOD") discloses two embodiments of a method for fabricating a container having two chambers, by two different methods. In the first embodiment, two separate molten-glass parisons are disposed within the same mould. During the glassblowing process the two containers merge with each other, forming a single container with two cavities and two openings. In the second embodiment, a single gob of molten glass is provided with two cavities, forming a two-chambered parison which is subsequently blown into a single container with two cavities and two openings.

However, GARWOOD does not fabricate a plurality of containers, but merely a single double-chambered container; the two chambers cannot be separated without breaking, cutting, or otherwise permanently modifying the container. Nor does GARWOOD resolve the expense required in furnishing mould assemblies for each container being fabricated. Moreover, the use of such moulds also lengthens the container fabrication cycle, in that it requires time to open and close the mould, and to insert the parison(s) and extract the finished container. This additional time lengthens the duration of a container fabrication cycle and therefore comprises a limitation on the output of a container fabrication system.

U.S. Pat. No. 6,355,204 also describes a method for manufacturing a single double-chambered container.

A further constrain to be mentioned in the case of use of pressurized gas blow molding technology is that the control and coordination of pressurized gas injection for simultaneous injections has not been yet optimised.

Finally, such systems are disadvantageous in that any additional packaging elements, such as labels or bindings, must be provided in a separate step with separate equipment. This adds further complication and expense to the operation of a container production installation.

It is therefore an object of the invention to provide a method for fabricating a plurality of containers which resolves at least some of the above issues.

SUMMARY OF THE INVENTION

In a first aspect of the invention there is provided a method for fabricating a plurality of containers, comprising the steps of providing a plurality of preforms each defining a cavity, each preform being disposed at a distance between two and ten times its diameter from at least one other preform; positioning said plurality of preforms in proximity to each other; and injecting a volume of an incompressible fluid into the cavity of each of said preforms so as to induce said plurality of preforms to expand into said plurality of containers; an abutting portion of the surface of each of said containers coming into abutment with an abutting portion of the surface of at least one other container during the injecting step, the expansion of said containers being thereby constrained.

This is advantageous in that it will fabricate multiple containers at once while simplifying the mould equipment required to bring the containers into the proper form. Specifically, the expanding preforms will come into abutment with each other and mutually constrain each other's expansion by the action of the equal fluid pressure within the preforms. Thus, the form of the expanding preforms, and thus of the resulting containers, is partially defined by the other preforms in the group.

One need therefore only provide a single mould for the entire groups of preforms in a form that defines the overall shape of the group of containers and the portion of the surfaces thereof which face outwardly from the group.

Moreover, by its nature the method produces a plurality of containers at once, yielding improved output and efficiency for the apparatus embodying it.

In a preferred embodiment of the invention, during the injection step at least two adjacent containers adhere to each other over the abutting portions of the surfaces thereof.

This is advantageous in that it produces in a unit which comprises several individual containers, facilitating the sale and transportation of groups of containers.

According to an embodiment of the invention, the pressure and/or the size of the abutting portion and/or the preform temperature and/or the preform material are determined such that the fabricated containers are detachable from each other by an average final consumer of the plurality of fabricated containers.

In this way, the containers can still be used individually by an average final consumer, while remaining easy to sale and to transport.

Most preferably, the method further comprises a stretching step wherein, for each preform, a stretch rod is advanced into the cavity of said preform so as to bear upon a surface of said cavity and thereby induce said preform to stretch along a longitudinal axis thereof.

In this way, the user will realize containers of greater length and more elongated form than is possible without longitudinally stretching the preform.

Additionally, the addition of the stretching step permits the user to exercise a greater degree of control over the longitudinal deformation of the preform, and therefore a greater degree of precision in the length of the containers that are fabricated.

Preferably, during the injecting step each preform is injected with a substantially identical volume of incompressible fluid, the incompressible fluid being injected into each preform substantially simultaneously.

In this way, groups of containers having a substantially identical size and shape, and having an identical interior volume, are simply and rapidly produced.

In another embodiment, during the positioning step a constraining element is disposed in proximity to the plurality of preforms, said constraining element at least partially constraining the expansion of the containers during the injecting step.

This is advantageous in that a portion of the surface of the containers is defined by the surface of the constraining element with which it is in contact, realizing a high degree of precision and surface finish in the container over that portion of its surface.

Moreover, the provision of such a constraining element that at least partially constrains the expansion of a preform will alter the form of the resulting containers in the region where it contacts the expanding preform. This enables the user to produce containers locally provided with hand grips, indentations or protrusions, waves or ridges, finished bottoms, etc. without otherwise affecting the expansion of the preform beyond the aforementioned surfaces where it abuts another such expanding preform.

As a practical embodiment, a surface of the constraining element comprises at least one textured region, said at least one textured region impressing a texture into the surface of at least one of the containers during the injecting step.

In this way, desirable surface textures are provided in the surface of the containers in a simple and adaptable way.

In another practical embodiment the constraining element is at least partially constituted by a packaging element, said packaging element being retained with the plurality of containers at the completion of the injecting step.

This is advantageous in that it fabricates a plurality of containers and packages them together for distribution and use in a single step, on a single apparatus. The output of such a container fabrication installation is thereby increased, while its size, complexity, and cost of implementation are simultaneously decreased.

In a further possible embodiment, the method is further characterized in that during the providing step at least one constraining element is provided between at least two of the preforms, the expansion of said at least two preforms being thereby constrained during the injecting step; and further comprising a withdrawing step performed after the injecting step for withdrawing the constraining element provided during the insert positioning step from between the containers.

This is advantageous in that when fabricating containers in an array, the constraining element disposed between the preforms will constrain the expansion of the preform in the region disposed at the interior of the array of finished containers. The user will in this way realize better control over the form of the finished containers.

In a practical embodiment, the method comprises a labelling step performed simultaneously with or after the injecting step, wherein a label is affixed to at least one of the containers.

According to an embodiment, the labelling step comprises a step of affixing a first label to at least a first container of the plurality of containers and a step of affixing a second label, different from the first label, to at least a second container of the same plurality of containers.

In this way, containers having different labels can be produced together.

According to an embodiment, said step of affixing a first label to at least a first container and said step of affixing a second label to at least a second container are both performed simultaneously with the injecting step.

In another practical embodiment, the method comprises a sealing step after the injecting step, wherein the volume of incompressible fluid injected into each preform is retained and sealed within the resulting container.

The sealing step should be understood as comprising for example attaching in a liquid tight manner a detachable cap on the resulting container. It could also comprise fixing or gluing a thin cover, like a paper of flexible cover closing the container in a liquid tight manner, such fixing or gluing being able to be withdrawn by an average final consumer of the resulting container.

In this way, fully formed, filled, sealed, and labelled containers are produced in a single operational cycle of a single machine. This greatly improves the efficiency and capacity of a container fabricating and filling operation.

According to a particular embodiment, said step of injecting a volume of incompressible fluid into the cavity of each of said preforms comprises a step of injecting a first liquid into the cavity of at least a first preform of the plurality of preforms and a step of injecting a second liquid, different from the first liquid, into the cavity of at least a second preform of the same plurality of preforms.

In this way, containers containing different liquids can be produced together.

According to a second aspect of the invention, there is provided a system for fabricating containers and filling each container of said plurality of containers with liquid, comprising: at least one pressurized liquid source containing one liquid and pressurizing means arranged to deliver said liquid under pressure, a plurality of preforms, a plurality of nozzles, each adapted to mate with a preform of the plurality of preforms and each being in fluidic communication with the at least one pressure source in order to inject the liquid under pressure into a cavity of said preform such that said preform is expanded into a container and said container is simultaneously filled with liquid, and at least a constraint element receiving the plurality of preforms and arranged to allow at least an abutting portion of a preform to come into abutment with an abutting portion of another preform during expansion into a container of both said preform and said other preform.

This is advantageous in that such a system will realize the advantages of the method as described above. Furthermore, the presence of the at least one constraining apparatus in the system will locally constrain the preform. The containers produced by the system will thus be provided with desired surface features in localized areas without the need to provide a mould having a cavity that defines the entire surface of the container.

In a practical embodiment, said preform is disposed in the constraint element at a distance between two and ten times the diameter of said preform from at least said other preform.

In a particular embodiment, the nozzles of said plurality of nozzles are fixed in position and orientation relative to each other.

In a practical embodiment, the constraining element at least partially delimits a region extending from the plurality of nozzles.

Preferably, the constraining element comprises a textured surface, said textured surface being disposed generally facing the region extending form the plurality of nozzles.

In this way, the finished containers produced by the apparatus are furnished with localized surface attributes, as described above.

In another embodiment, at least one constraining element is disposed within the region extending from the plurality of nozzles.

This is advantageous in that it will constrain the expansion of the preforms over the portions of their surface at the interior of the region, bringing the advantages mentioned above.

According to an embodiment, the system is of a linear type, comprising several pluralities of nozzles, wherein a constraint element is associated with each plurality of nozzles, each constraint element and each plurality of nozzles being movable in translation without rotation.

According to an embodiment, the system is of a one step type, the system comprising: a preform manufacturing equipment, a plurality of preform holding devices, and a transfer apparatus arranged to transfer each manufactured preform associated with a preform holding device into a constraint element.

According to a third aspect of the invention, there is provided a package comprising a plurality of containers fabricated by the method as previously described.

Such a package realises the advantages of the method as enumerated above, in the form of a package of containers which is rapidly and inexpensively produced.

In a practical embodiment, the containers are fabricated in a plurality of groups, each group being fabricated in a single iteration.

This is advantageous in that it will yield packages with a range of sizes and numbers of containers therein, while minimizing the cost and complexity of the container fabrication process. The efficiency of the production of containers, and their ultimate distribution, is thereby improved.

In a practical embodiment, at least a first container of the package is filled with a first liquid and at least a second container of the same package is filled with a second liquid, different from the first liquid.

In a practical embodiment, a first label is affixed on said at least first container and a second label, different from the first label, is affixed to said at least second container.

According to other features of the package of the invention:
the form of each of said containers is partially defined by the other containers in the group through expansion of the preforms;
a portion of the surface of each of said containers comes into abutment with a portion of the surface of at least one other container;
at least two adjacent containers adhere to each other over the abutting portions of the surfaces thereof;
the at least two adjacent containers are detachable from each other by an average final consumer of the plurality of containers;
the containers are provided with flat surfaces in the form of the contact surfaces;
the package further comprises a packaging element, constituting a constraining element, said packaging element being retained with said plurality of containers;
said packaging element is a tray which is comprised of a floor, with or without a wall which extends from the perimeter of the floor;
said constraining element has a concave, generally tube-shaped form, comprising a floor from the perimeter of which extends a wall;
a shaping insert is disposed among the containers;
said containers have a substantially identical shape and profile;
an overwrap serves to bind the containers together into a single, easily-manipulated package;
said containers are provided in the form of two rows; and
the package combines groups of containers differing in size, shape, volume and/or quantity.

BRIEF DESCRIPTION OF THE FIGURES

Other particularities of the invention will also become evident from the following description.

In the accompanying drawings, given by way of non-limiting examples:

FIGS. 1A through 1D depict respectively a side view of a plurality of preforms prior to an injecting step; a top view of said plurality of preforms; a side view of a plurality of containers at the conclusion of an injecting step; and a top view of said plurality of containers, according to a first embodiment of the invention;

FIGS. 2A through 2D depict respectively a top view of a plurality of preforms prior to an injecting step; a side section view of said plurality of preforms; a top view of a plurality of containers after an injecting step; and a side section view of said plurality of containers, according to a second embodiment of the invention;

DETAILED DESCRIPTION

Figure 3B:
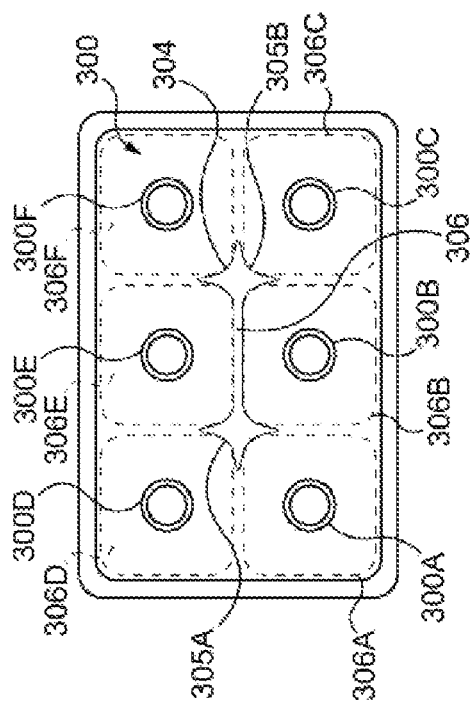
FIGS. 3A through 3D depict, respectively, a side section view, a top view, and two side section views of a series of steps for fabricating a plurality of containers according to a third embodiment of the invention.

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description. As used in this specification, the words "comprises", "comprising", and similar words, are not to be interpreted in an exclusive or exhaustive sense. In other words, they are intended to mean "including, but not limited to.

Any reference to prior art documents in this specification is not to be considered an admission that such prior art is widely known or forms part of the common general knowledge in the field.

The invention is further described with reference to the following examples. It will be appreciated that the invention as claimed is not intended to be limited in any way by these examples.

It should be understood that where a group of substantially identical components is referenced with a numeral and a letter (e.g. "600A, 600B, 600C"), any subsequent use of that numerical reference without any letter (e.g. "600") should be understood as referencing the entire group.

The main principle of the invention is first described.

FIGS. 1A through 1D depict, respectively, a top view of a plurality of preforms prior to an injecting step; a side view of said plurality of preforms; a top view of a plurality of containers after said injecting step; and a side view of said plurality of containers, according to a first embodiment of the invention.

FIG. 1A is a side view of a plurality of preforms 100A, 100B, & 100C. The preforms 100A, 100B, & 100C are of a type conventional to the art of container fabrication, having mouths 101A, 101B, 101C communicating respectively with a cavity 102A, 102B, 102C within the preform 100A, 100B, 100C.

During a positioning step of the method of the invention, the preforms 100A, 100B, 100C are disposed with the mouths 101A, 101B, 101C in substantially the same vertical orientation, said mouths 101A, 101B, 101C being, in this embodiment, oriented upwards. The longitudinal axes 103A, 103B, 103C of the preforms are thus parallel, the preforms 100A, 100B, 100C being substantially equally spaced from each other.

It is further envisioned that for each preform there is provided a stretch rod, depicted here as the stretch rods 104A, 104B, 104C. During the injecting step, the stretch rods 104A, 104B, 104C are advanced into the preforms 100A, 100B, 100C so as to induce them to stretch along the longitudinal axes 103A, 103B, 103C. In this way, one will exercise a great deal of control over both the exact length of the resulting containers and their overall form.

Of course, it is to be understood, of course, that the configurations of preforms 100A, 100B, 100C are merely representative of a preform as commonly employed in the container fabricating arts, and thus the exact form and configuration of the preform is not limited to that which is depicted in the present application. Moreover, the person of skill in the art will be readily capable of choosing the proper material and physical dimensions for the preform. Thus, in any particular implementation of the invention, such aspects of the invention may vary without departing from the basic principles of the invention.

FIG. 1B depicts the plurality of preforms 100A, 100B, 100C of FIG. 1A in a top view, as well as a second row of preforms 100D, 100E, 100F, thereby forming a 2×3 array A of preforms 100. The preforms 100 are separated within the array A by the horizontal separations $x_1$, $x_2$, $x_3$, and $x_4$, and the vertical separations $y_1$, $y_2$, and $y_3$.

By adjusting the relative and absolute magnitudes of the horizontal and vertical separations $x_n$ and $y_n$, the user may control the relative and absolute degree of expansion for each of the preforms 100A, 100B, 100C, 100D, 100E, 100F, as well as producing desired variations in the shape of containers produced therefrom.

In any event, the horizontal and vertical separations $x_1$, $x_2$, $x_3$, $x_4$, $y_1$, $y_2$, and $y_3$ are chosen so as to be between two and ten times the diameter of the preforms they separate, thereby ensuring both a proper abutment between the expanding preforms and a correct form of the resulting containers, and that the preforms are not expanded beyond a degree where the walls of the resulting containers would be too thin and weak for ordinary use.

FIG. 1C depicts a plurality of containers 105A, 105B, 105C fabricated from the preforms 100A, 100B, 100C depicted in the previous two figures, at the conclusion of an injecting step. The containers 105A, 105B, 105C are fabricated by a conventional liquid blow-moulding process, wherein a volume of incompressible fluid is injected into the preforms 100A, 100B, 100C under pressure, inducing them to expand. Such a process is known in the art and the person of skill in the art will be capable of providing a container fabricating machine and configuring the parameters of the fluid injection (i.e. injection pressure, stretch rod advancement, liquid volume) as most appropriate for the particular application in question. According to an embodiment, the incompressible fluid injected into the preforms is not the same for all the preforms. For example, a first liquid can be injected in a first or a group of first preforms and a second liquid, different from the first liquid, can be injected in a second or a group of second preforms, and so on with possibly as many different liquids as there are different preforms in the plurality of preforms being produced.

The containers 105A, 105B, 105C are here depicted at the conclusion of an injecting step, wherein the injection of an incompressible fluid 106 causes the preforms 100A, 100B, 100C (here depicted in dashed lines) to expand into the containers 105A, 105B, 105C. Owing to the physical proximity of the preforms 100A, 100B, 100C (as depicted in the previous two Figures), the expanding preforms 100A and 100B come into abutment against each other over the contact surface 107, and the expanding preforms 100B and 100C come into abutment along the contact surface 108.

To better illustrate the principle of the invention, the containers 105 are expanded without any external mould or other such constraining device, which is reflected in their overall round, teardrop-shaped profile. The expansion contours 109A, 109B, 109C respectively represent the contours of the containers 105A, 105B, 105C if they had been permitted to expand freely during the injection of the incompressible fluid 106. However, owing to the abutment of the containers 105A, 105B, 105C at the contact surfaces 107, 108, their expansion is constrained during the injection step, yielding the containers 105A, 105B, 105C whose forms which are depicted in FIG. 1C.

FIG. 1D depicts the containers 105A, 105B, 105C in a top view, along with the containers 105D, 105E, 105F which are omitted from FIG. 1C for clarity. As can be seen in this Figure, the containers 105 form several contact surfaces where at least two of them meet: in addition to the contact surfaces 107 and 108 described above, the contact surfaces 110 and 111 between the containers 105D & 105E and 105E & 105F respectively; and the contact surfaces 112, 113, and 114 between the containers 105A & 105D, 105B & 105E, and 105C & 105F, respectively. The portion(s) of the contact surfaces of the containers in contact with each other can be referred to as abutting portion(s) of the surface of the containers.

As can be seen in FIG. 1D, the containers 105 have during their expansion diverged from having a substantially circular cross-section, as would be seen if they were permitted to expand freely, resulting in the cross-sectional forms seen here. In particular, the containers 105A, 105D, 105C, and 105F, being constrained in their expansion over only two surfaces, have expanded towards the corners of the group of containers 105. The containers 105B and 105E, the expansion of which is constrained over three surfaces, have expanded directly outwards.

In this way, a plurality of containers 105 may be produced without employing a mould of any sort, avoiding the cost and complexity implicated in the provision thereof. The containers 105 are nonetheless provided with flat surfaces in the form of the contact surfaces 107, 108, 110, 111, 112, 113, & 114, on which they may be laid for storage.

Of course, it will be readily understood by one skilled in the art that the degree of expansion and the ultimate form the containers at the completion of the injection is a function of a number of factors, including but not limited to the pressure and volume of liquid injected into the preforms, the disposition of the preforms relative to each other prior to the injection of the incompressible fluid, the number and positioning of the preforms, and the form of the preforms and the material properties of the polymer resin from which they are fabricated.

Moreover, different forms of containers may be realised by altering the timing and speed of the injection from one preform to another, for instance performing the injection of the incompressible fluid into the preforms sequentially, with or without overlapping the injection from one preform to the next. This result can also be achieved by injecting a different liquid in some of preforms.

It should therefore be understood that the foregoing example is merely exemplary in nature; the exact disposition of the preforms and the parameters of the injection and fabrication of the containers may be adapted to the particular objects of the implementation in question.

FIGS. 2A through 2D depict respectively a top view of a plurality of preforms prior to an injecting step; a side section view of said plurality of preforms; a top view of a plurality of containers upon the completion of an injecting step; and a side section view of said plurality of containers, according to a second embodiment of the invention.

FIG. 2A is a top view of an array B of preforms 200A, 200B, 200C, 200D, 200E, and 200F, disposed in an evenly-spaced 2×3 arrangement. The preforms 200 are disposed within a packaging element represented by the tray 201, which is comprised of a floor 202 disposed beneath the closed ends of the preforms and a wall 203 which extends from the perimeter of the floor 202.

FIG. 2B is a side section view of this arrangement, taken through the section line A-A depicted in FIG. 2A. Upon the injection of an incompressible fluid into the preforms 200, the tray 201 will serve to partially constrain the expansion of the preforms 200, leaving them free to expand in the region extending from the top of the wall 203. The tray 201 therefore forms a constraint element of the system for producing a container, as will be described subsequently.

Of course, the configuration of the tray 201 is merely exemplary, and in other embodiments may be more or less elaborate and thereby restrain to a greater or lesser degree the expansion of the preforms disposed within.

Indeed, the tray 201 may in fact be supplemented or replaced by other constraint elements such as plates, bars, cups, or the like, which are strategically placed about the plurality of preforms so as to constrain the expanding preforms over a limited and specific part of their surface. This localized constraint cooperates with the inter-preform constraint as heretofore described to produce containers with particular surface features defined by the constraint elements.

For instance, the tray 201 may be furnished with a wall 203 of greatly reduced height, or even entirely without the wall 203, such that it effectively only constrains the expansion of a bottom surface of the expanding preform. The resulting containers will thereby be provided with a flat bottom, facilitating their storage and use.

In other possible embodiments, the tray or other such constraint element(s) may further comprise a region or regions on its surface configured to impress a particular texture or pattern into the surface of the container where it constrains the expansion of the preform. This may include, for example, product logos or labels to facilitate identification, waves, knurling, or ribbing to improve grip and container strength, or indentations or shoulders to provide a hand grip or handle. Such textures may be provided in simple plate elements textured with common metalworking processes, producing groups of containers with complex surface contours and textures without the need to furnish complex and expensive mould blocks.

FIG. 2C is a top view of the array B of containers 204A, 204B, 204C, 204D, 204E, 204F at the conclusion of an injecting step. As can be seen here, the containers 204 have expanded into the limits of the tray 201, notably being constrained by the wall 203, in addition to expanding into abutment against each other along the contact surfaces 205, 206, 207, 208, 209, 210 as in the previous embodiment. The resulting containers 204 have a substantially identical shape and profile.

The addition of the tray 201 thus permits one to realize the previously-mentioned advantages of the invention while also producing containers of uniform profile.

In this embodiment, the liquid injected into the containers 204 is retained and sealed therein, and the tray 201 is retained about the containers 204 to collectively comprise the package 211. This yields a set of containers 204 that are fabricated, filled, and packaged in a single step.

Depending on the particular embodiment, the construction of the tray 201 or other such packaging element may vary. For instance, in applications where the package is intended for consumer use, the tray 201 may take a form substantially as depicted here, fabricated from an inexpensive, lightweight material such as paperboard for a one-time use. Optionally, the tray 201 may be supplemented by an overwrap of plastic film, to create an inexpensive but solid bundle of containers ready for distribution to consumers.

Alternately, when the containers are intended for heavier use such as that encountered in industrial, commercial or institutional contexts, it may be advantageous to furnish the packing element in a form which is more robust, and possibly re-useable. In such a case, the packing element may be furnished in the form of a plastic or metal crate. A packing element provided in such a durable configuration will be better able to withstand the rigours inherent in such uses.

FIG. 2D is a side section view of the package 211 and the containers of FIG. 2C, taken through the section line B-B indicated thereon. The containers 204D, 204E, 204F have been expanded into abutment with each other over the contact surfaces 209 and 201, and have additionally been constrained by the wall 203 and floor 202 of the tray 201, resulting in them assuming the flat-bottomed, generally squared form shown in this Figure.

Moreover, in the present embodiment the containers 204 are of substantially the same size and form, each having been injected with a substantially identical volume of the incompressible fluid at substantially the same instant, and being thereby induced to expand to a substantially equal degree. However, in other implementations it may be preferable to inject differing volumes of liquid so as to form containers of differing sizes and shapes. This result can also be achieved by injecting a different liquid in some of preforms.

Figure 3D:
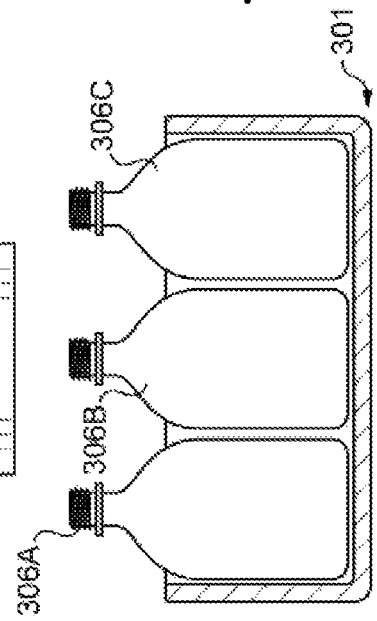
Figure 3A:
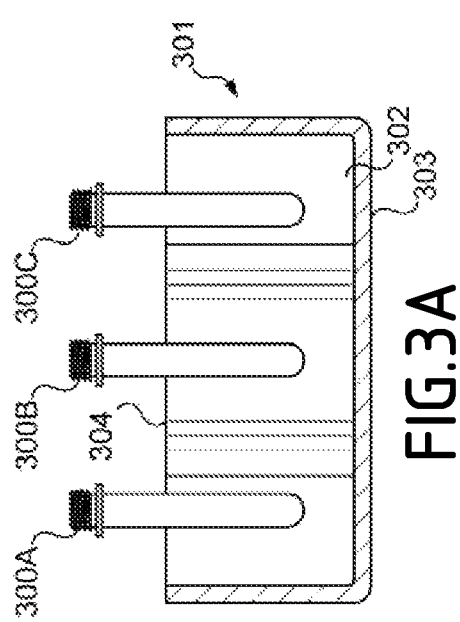

FIGS. 3A through 3D depict, respectively, a side section view, a top view, and two side section views of a series of steps for fabricating a plurality of containers according to a third embodiment of the invention. FIG. 3A depicts three preforms 300A, 300B, 300C prior to an injection step, the preforms 300A, 300B, 300C being disposed in proximity to a constraining element 301 as in FIGS. 2A through 2D. The constraining element 301 has a concave, generally tub-shaped form, comprising as in the previous embodiment a floor 302 from the perimeter of which extends the wall 303.

There is further provided the shaping inserts 304, which is a specially-configured constraining element that is disposed within the constraining element 301 among the preforms 300. The shaping insert 304 extends from around the tops of the preforms 300 to the floor 302 of the constraining element 301. The form of the shaping insert 304 is now discussed.

FIG. 3B is a top view of the preforms 300A, 300B, 300C, 300D, 300E, and 300F, prior to an injection step. The shaping insert 304 can be seen to have two main sections in the form of the star-shaped extrusions 305A and 305B, which are connected by the web 306.

During a subsequent injecting step the preforms 300 are expanded into the containers 306A, 306B, 306C, 306D, 306E, 306F as depicted here in dashed lines; the star-shaped extrusions 305A, 305B and the web 306 serve to partially define the final form of the containers 306. However, as the preforms expand they still come into abutment with each other in abutting portions where the shaping insert 304 is not present, specifically at the interface between the containers 306A & 306D and 306C & 306F; and between the containers 306A & 306B, 306B & 306C, 306D & 306E, and 306E & 306F.

In this way, the shape of the containers in the regions between the containers (here occupied by the shaping insert 304) can be defined, while still realizing the benefits of the inter-preform abutment during the injection of the incompressible liquid. Of course, the shaping insert may be provided in other forms in other forms, as required by the circumstances of any particular application.

Figure 3C:
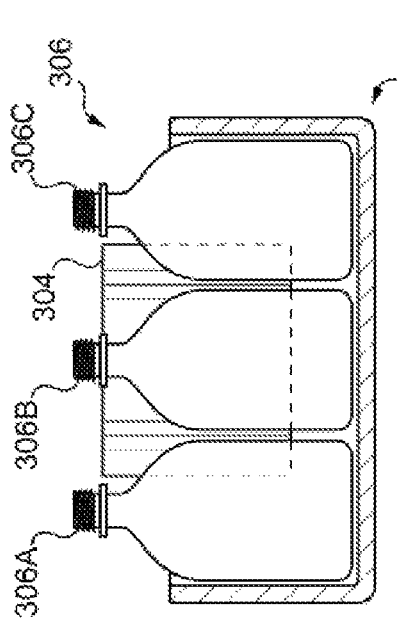

FIG. 3C is a side view which depicts the containers 306 at the conclusion of an injecting step, and prior to a withdrawing step. The shaping insert 304 remains disposed among the containers 306, which have assumed their final shape after the injection of the incompressible fluid. The shaping insert 304 will add an amount of structural strength to the assemblage of containers 306 and the constraining element 301, and in applications where the containers are not sealed, labelled, or wrapped on the same apparatus it may be advantageous to leave the constraining element 304 in place temporarily while the containers 306 are transported during production.

FIG. 3D depicts a withdrawing step, wherein the shaping insert 304 is withdrawn from the containers 306. The containers 306 may then be removed from the constraining element 301, or distributed therewith as in cases where the constraining element 301 is a packaging element. The shaping insert 304 may then be reused in a subsequent iteration of the process; it is preferred that the shaping insert 304 is provided as an integral component of the container-fabricating apparatus, but it may alternatively be provided in the form of removable pieces which are manipulated by the container-fabricating apparatus but not integrated therein. The user will be capable of determining the proper configuration for any particular implementation.

Figure 4:
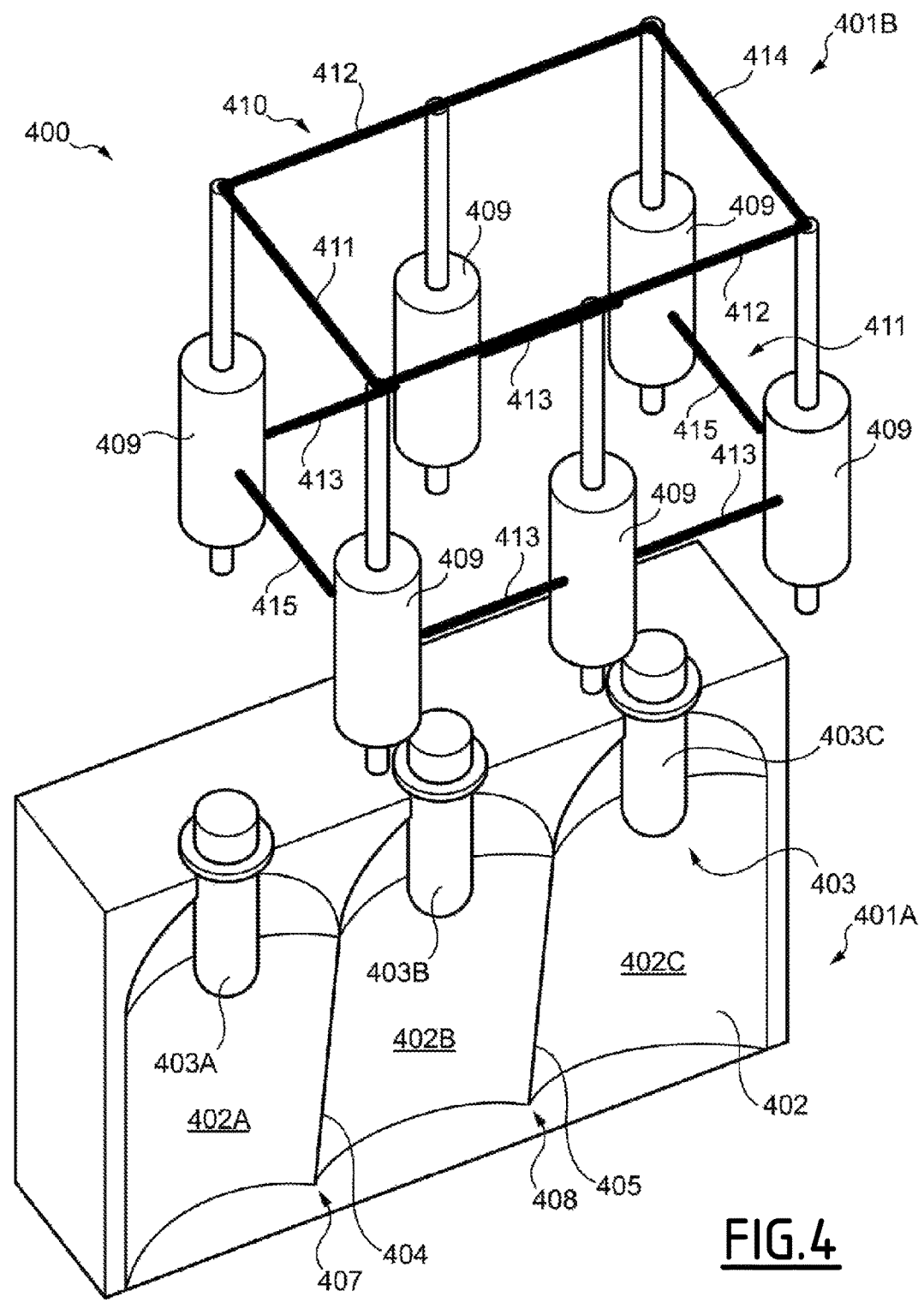
FIG. 4 depicts a system according to a fourth embodiment of the invention.

FIG. 4 depicts a system, also referred to as an apparatus, 400 according to a fourth embodiment of the invention, globally comprising a constraint element 401A and an injection element 401B. It should be noted that this Figure only depicts one of four such constraint elements; the other three are omitted for clarity but are substantially similar to the constraint element 401A.

The constraint element 401A comprises three chambers 402A, 402B, 402C, into which are respectively disposed the preforms 403A, 403B, 403C. The chambers 402 are contiguous with each other: the intersection of the chambers 402A & 402B is defined by the chine 404, while the intersection of chambers 402B & 402 is defined by the chine 405.

It will be noted that the chines 404 & 405 do not extend all the way to the edge 406 of the constraint element 400. When the constraint element 400 is closed against an identical constraint element disposed opposite it, the gaps 407 and 408 are formed, respectively establishing fluid communication between the chambers 402A & 402B and 402B & 402C.

Thus, upon the injection of an incompressible fluid into the preforms 403, the preforms 403 will expand into the gaps 407 and 408. The preform 403A comes into abutment with the preform 403B through the gap 407, in the region of the chine 404; likewise, the preform 403C comes into abutment with the preform 403B through the gap 408, along the chine 405. Notably, by varying the parameters of the injection of the incompressible fluid and the pre-heating of the preforms 403, one may produce containers which lightly adhere to one another over the surfaces where they are in abutment.

In this way, the system or apparatus 400 will produce a complement of containers which are bonded to each other over the surfaces where they abut. The user may thereby produce multiple-container packages which adhere to each other and thus are easily transported, but which may easily be separated from the other containers and its contents consumed. To this end, the pressure and/or the size of the abutting portion and/or the preform temperature and/or the preform material can be determined such that the fabricated containers are detachable from each other by an average final consumer of the plurality of fabricated containers.

Such a package is particularly convenient for use at picnics, when traveling, etc. where it is desirable to have a number of easily-transportable containers of, e.g. a beverage.

The system or apparatus 400 also comprises the injection element 401B. The injection element 401B globally comprises a plurality of nozzles 409. The nozzles 409 are maintained in relation to each other by the upper frame 410 and the lower frame 411, which means that the nozzles of the plurality of nozzles 409 are fixed in position and orientation relative to each other. The upper frame 410 and lower frame 411 respectively comprise the longitudinal members 412 and 413 and the lateral members 414 and 415. The longitudinal members 412 & 413 and lateral members 414 & 415 extend between the nozzles 409, maintaining them in a fixed orientation relative to each other.

The plurality of nozzles 409 is placed in fluidic communication with at least one pressurized liquid source containing one liquid and pressurizing means arranged to deliver said liquid under pressure to each of the nozzles, which, in turn, inject said liquid in the preforms. According to an embodiment, the nozzles of the plurality of nozzles 409 are not all connected to the same source of pressurized liquid. This means that at least one first nozzle or a group of first nozzles of the plurality of nozzles 409 are in fluidic communication with a first pressurized liquid source containing a first liquid and that at least one second nozzle or a group of second nozzles of the same plurality of nozzles 409 are in fluidic communication with a second pressurized liquid source containing a second liquid, different from the first liquid. In this manner, the first liquid will be injected in the preform(s) in which the first nozzle(s) is (are) engaged and the second liquid will be injected in the preform(s) in which the second nozzle(s) is (are) engaged. Consequently, the containers of a same plurality of containers can be filled with different liquid in the same forming and filling step of the containers. It should be understood that more than two pressurized liquid sources can be provided. In particular, each nozzle can be placed in fluidic communication with a different pressurized liquid source such that the containers of a same plurality of containers are each filled with a different liquid.

It will be noted that the constraint element 401A delimits a region 402 which is comprised by the chambers 402A, 402B, 402C, collectively. By varying the size, shape, and form of the region 402 one may alter the ultimate form of the containers produced by the apparatus 400.

By contrast, the injection element 401B is mobile relative to the constraint element 401A, permitting the nozzles 409 to be engaged upon the preforms 403 so as to inject an incompressible liquid therein during a fabrication process, and then subsequently disengaged so as to permit the resulting containers to be removed.

Furthermore, it may be advantageous to provide the longitudinal members 412 & 413 and the lateral members 414 & 415 in a variable-length construction, so as to permit the injection element 401B to adapt to differing spacing between the preforms 403. Such a variable-length construction of the longitudinal members 412 & 413 and lateral members 414 & 415 may be achieved by methods known in the mechanical arts, for instance by employing a leadscrew or a pneumatic or hydraulic cylinder. Whatever the means employed, the length of the longitudinal members 412 & 413 and lateral members 414 & 415 is fixed prior to the commencement of the injecting step, thereby placing the nozzles 409 in fixed orientation and position relative to each other.

Also, for other applications it may be advantageous to furnish a shaping insert such as the one disclosed in FIGS. 3A to 3D. One skilled in the art of machine design will be able to configure the apparatus so as to incorporate such a shaping insert.

In this way, the user may thus adapt the system or apparatus 400 to produce containers in differing volumes and thereby optimize the output of the apparatus 400 in a commercial application.

Figure 5:
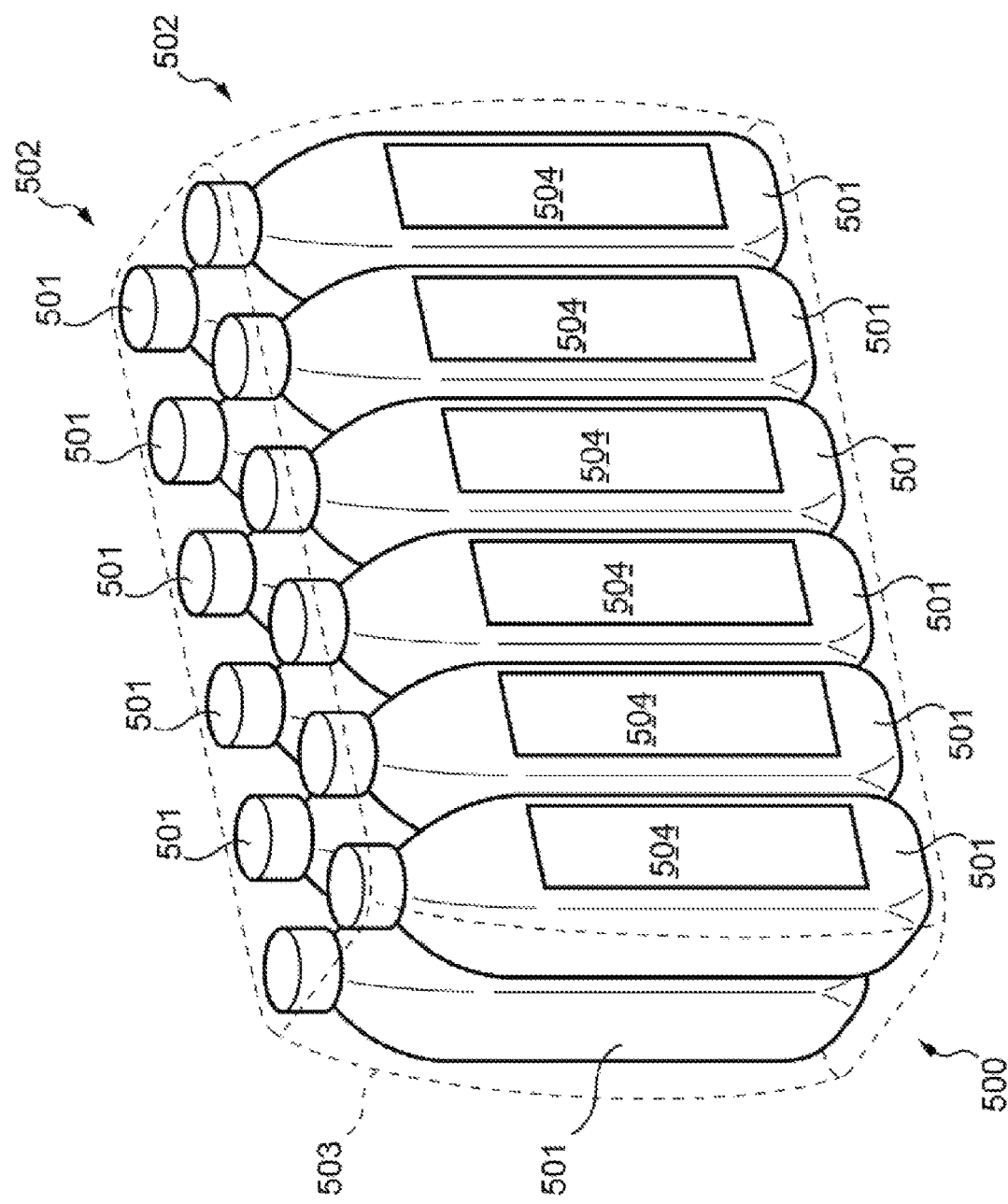
FIG. 5 depicts a package of containers according to a fifth embodiment of the invention.

FIG. 5 depicts a package 500 of containers 501 according to a fifth embodiment of the invention. The containers 501 are here provided in two rows 502 of six containers 501 each. Of course, other arrangements are possible, comprising more or fewer containers arranged in more or fewer rows, and possibly in different sizes and volumes.

The containers 501 are further contained in an overwrap 503, which serves to bind the containers 501 together into a single, easily-manipulated package. The overwrap 503 is here provided in the form of sheet of heat-shrinkable plastic, but may of course be provided in other forms, and from other materials, as known in the container fabrication and related arts.

In this embodiment, the containers 501 are of the same size, shape, and volume, and are provided in the form of the two rows 502. This is advantageous in that only one apparatus need be employed to fabricate the containers 501; the two rows 502 of the containers 501 are fabricated in two operating cycles of such an apparatus representing two iterations of the method of the present invention.

However, in other embodiments, it may be advantageous to combine groups of containers differing in size, volume, shape, and/or quantity, so as to achieve various different and advantageous combinations of these attributes in the packages so constituted. The user thereby realizes a great deal of flexibility.

The containers 501 are each further provided with a label 504. The labels 504 may be applied in a labelling step that is carried out after the conclusion of the fabrication of the container. Alternately, the labels 504 may be disposed upon a surface of a constraining element such that during the injecting step the preforms are pressed against the labels, causing them to adhere to the resulting containers 501 in a labelling step that is simultaneous with the injection step.

This latter configuration is particularly advantageous, in that when employed in concert with an apparatus or system as described above, the user can produce containers which are fabricated, filled, and labelled in a single step, on a single apparatus. The user will thereby realize considerable advantages in the form of increased production rates and decreased physical space required for the production equipment.

Figure 6:
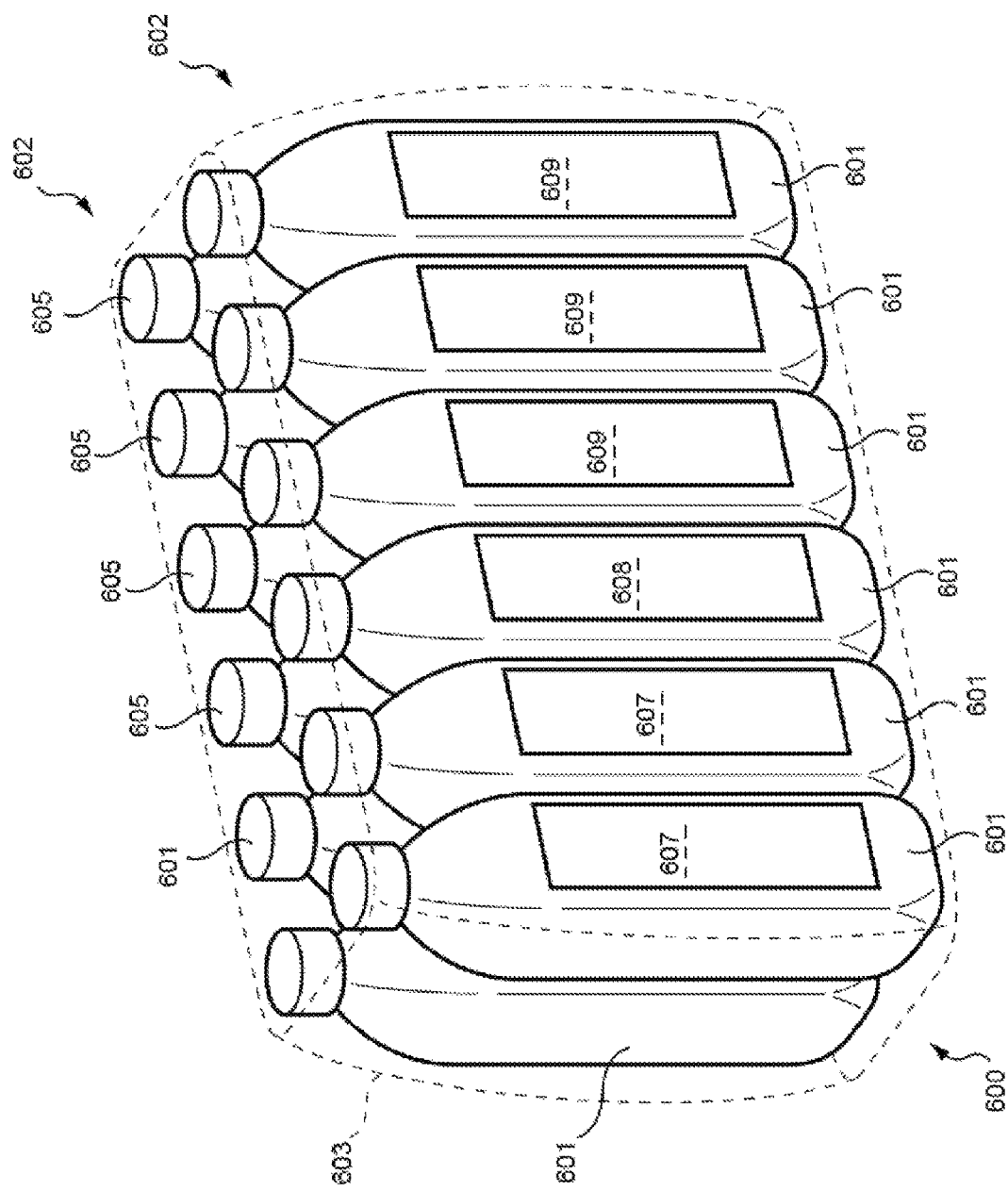
FIG. 6 depicts a package of containers according to a sixth embodiment of the invention.

FIG. 6 depicts a package 600 of containers 601 according to a sixth embodiment of the invention. The package 600 is similar to the package depicted in FIG. 5, i.e. the containers 601 are of the same size, shape and volume, are provided in the form of two rows 602 contained in an overwrap 603 and are each closed by a lid 605. The difference lies in the fact that different labels 607, 608, 609 are applied to the different containers 601. This means that the labelling step comprises a step of affixing a first label 607 to a first container 601 or to a group of first containers 601 and a step of affixing a second label 608 to a second container 601 or to a group of second containers 601, and possibly a step of affixing a third label 609 to a third container or to a group of third containers 601. According to a particular embodiment, each container is provided with a different label. This embodiment is particularly advantageous when the containers are filled with different liquids, as described previously. In this manner, the various liquids contained in the containers can be identified by the proper different labels affixed on the containers.

Figure 7:
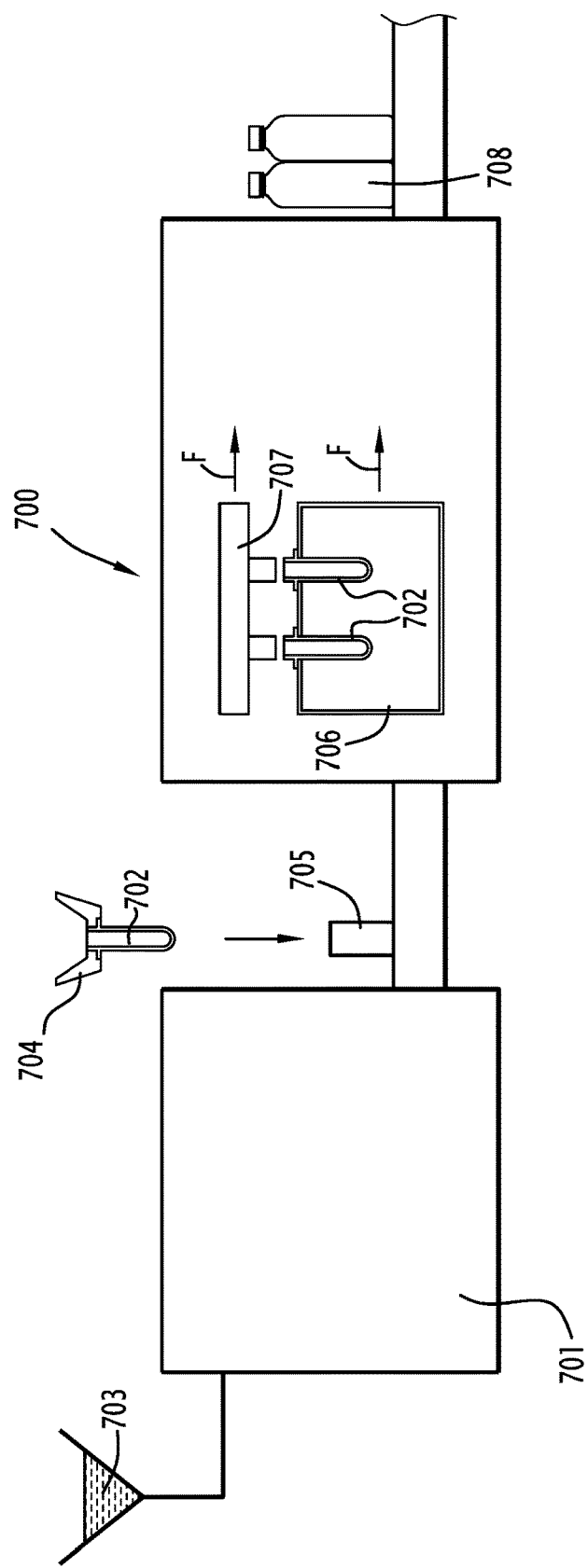
FIG. 7 depicts a diagrammatical view of a system for producing a plurality of containers according to a particular embodiment of the invention.

The system described above can implemented as a one step type system 700, as shown in FIG. 7. Such a system comprises a preform manufacturing equipment 701 arranged to produce the preforms 702 from a thermoplastic raw material source 703. The preforms are for example produced in batches using an injection process as known per se. The manufactured preforms exiting the preform manufacturing equipment 701 are picked up by a plurality of preform holding devices 704, which are each arrange to hold a preform while a transfer apparatus 705 transfers each manufactured preform 702 associated with a preform holding device 704 into a constraint element 706. The constraint element 706 can be arranged according to any of the embodiments described previously. Once all the preforms 702 are loaded in a constraint element 706, the preforms 702 are held in the constraint element 706 by appropriate holding means, while the plurality of nozzles 707 are engaged in the preforms 702 and the containers 708 are formed and filled by a liquid. At the outlet of the system 700, the plurality of containers 708 are obtained. As described previously, the plurality of containers 707 can be obtained in a package obtained in a single step, each container being filled with a single liquid or with different liquids and being labelled with the same or with different labels affixed to the containers, for example during the injection of the liquid(s) in the preforms.

In addition or alternatively, the system 700 is for example a linear type system, wherein the preforms 702 in the constraint element 706 and the plurality of nozzles 707 are moved together in translation, without rotation, during the injection of liquid(s) inside the preforms, as shown by arrows F of FIG. 7.

Such a system allows producing at a high rate packages of containers in parallel in a system which does not require too much space.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A method for fabricating a plurality of containers, comprising the steps of:
providing a plurality of preforms each defining a cavity, each preform being disposed at a distance from at least one other preform;
injecting a volume of an incompressible fluid into the cavity of each of the preforms so as to induce the plurality of preforms to expand into the plurality of containers;
constraining expansion of the containers by bringing an abutting portion of the surface of each of the containers into abutment with an abutting portion of the surface of at least one other container during the injecting step.

2. The method according to claim 1, wherein during the injecting step at least two adjacent containers adhere to each other over the abutting portions of the surfaces thereof.

3. The method according to claim 2, wherein at least one of pressure, size of the abutting portion, preform temperature, and preform material are determined such that the fabricated containers are detachable from each other by a final consumer of the plurality of containers.

4. The method according to claim 1, further comprising a stretching step wherein, for each preform, a stretch rod is advanced into the cavity of the preform so as to bear upon a surface of the cavity and thereby induce the preform to stretch along a longitudinal axis thereof.

5. The method according to claim 1, wherein during the injecting step each preform is injected with a substantially identical volume of incompressible fluid, the incompressible fluid being injected into each preform substantially simultaneously.

6. The method according to claim 1, wherein during the providing step a constraining element is disposed in proximity to the plurality of preforms, the constraining element at least partially constraining the expansion of the preforms during the injecting step.

7. The method according to claim 6, wherein a surface of the constraining element comprises at least one textured region, the at least one textured region impressing a texture into a surface of at least one of the containers during the injecting step.

8. The method according to claim 6, wherein the constraining element is at least partially constituted by a packaging element, the packaging element being retained with the plurality of containers at the completion of the injecting step.

9. The method according to claim 1, wherein during the providing step at least one constraining element is provided between at least two of the preforms, the expansion of the at least two preforms being thereby constrained during the injecting step; and further comprising a withdrawing step performed after the injecting step for withdrawing the constraining element provided during the providing step from between the containers.

10. The method according to claim 1, further comprising a labelling step performed one of simultaneously with or subsequently after the injecting step, wherein a label is affixed to at least one of the containers.

11. The method according to claim 10, wherein the labelling step further comprises a step of affixing a first label to at least a first container of the plurality of containers and a step of affixing a second label, different from the first label, to at least a second container of the plurality of containers.

12. The method according to claim 11, wherein the step of affixing a first label to at least a first container and the step of affixing a second label to at least a second container are both performed simultaneously with the injecting step.

13. The method according to claim 1, further comprising a sealing step after the injecting step wherein the volume of incompressible fluid injected into each preform is retained and sealed within each container.

14. The method according to claim 1, wherein the step of injecting a volume of incompressible fluid into the cavity of each of the preforms comprises a step of injecting a first liquid into the cavity of at least a first preform of the plurality of preforms and a step of injecting a second liquid, different from the first liquid, into the cavity of at least a second preform of the plurality of preforms.

15. A system for fabricating a plurality of containers and filling each container of the plurality of containers with liquid, comprising:
at least one pressurized liquid source containing a liquid deliverable under pressure,
a plurality of preforms,
a plurality of nozzles each adapted to mate with a preform of the plurality of preforms and each being in fluidic communication with the at least one pressurized liquid source in order to inject the liquid under pressure into a cavity of the preform such that the preform is expanded into a container and the container is simultaneously filled with the liquid, and
a constraint element receiving the plurality of preforms and arranged to allow at least an abutting portion of one preform to come into abutment with an abutting portion of another preform during expansion into the containers of the one preform and the other preform.

16. The system according to claim 15, wherein the preform is disposed in the constraint element at a distance from two to ten times a diameter of a body of the preform from the other preform.

17. The system according to claim 15, wherein the nozzles of the plurality of nozzles are fixed in position and orientation relative to each other.

18. The system according to claim 15, wherein the constraining element at least partially delimits a region extending from the plurality of nozzles.

19. The system according to claim 18, wherein the constraining element comprises a textured surface.

20. The system according to claim 19, wherein the textured surface is disposed generally facing the region extending from the plurality of nozzles.

21. The system according to claim 18, wherein at least one constraining element is disposed within the region extending from the plurality of nozzles.

22. The system according to claim 15, wherein the system is a linear system further comprising at least a second plurality of nozzles, and wherein a constraint element is associated with each plurality of nozzles, each constraint element and each plurality of nozzles being movable in translation without rotation.

23. The system according to claim 15, wherein the system is a one step system further comprising:
   a preform manufacturing equipment,
   a plurality of preform holding devices, and
   a transfer apparatus arranged to transfer each preform associated with a preform holding device into the constraint element.

24. A package comprising a plurality of containers fabricated according to the method of claim 1.

25. The package of claim 24, wherein the containers are fabricated in a plurality of groups, each group being fabricated in a single iteration.

26. The package according to claim 24, wherein at least a first container of the package is filled with a first liquid and at least a second container of the same package is filled with a second liquid, different from the first liquid.

27. The package according to claim 26, wherein a first label is affixed on the first container and a second label, different from the first label, is affixed to the second container.

28. The method of claim 1, wherein each of the preforms are disposed apart from an adjacent preform in the range of about two to ten times a diameter of the preforms.

* * * * *